April 26, 1966 F. E. HOLLADAY 3,247,945
AUTOMATIC LINE FIND DEVICE
Filed Oct. 14, 1963 4 Sheets-Sheet 1

INVENTOR.
FORREST E. HOLLADAY.
BY
ATTORNEY.

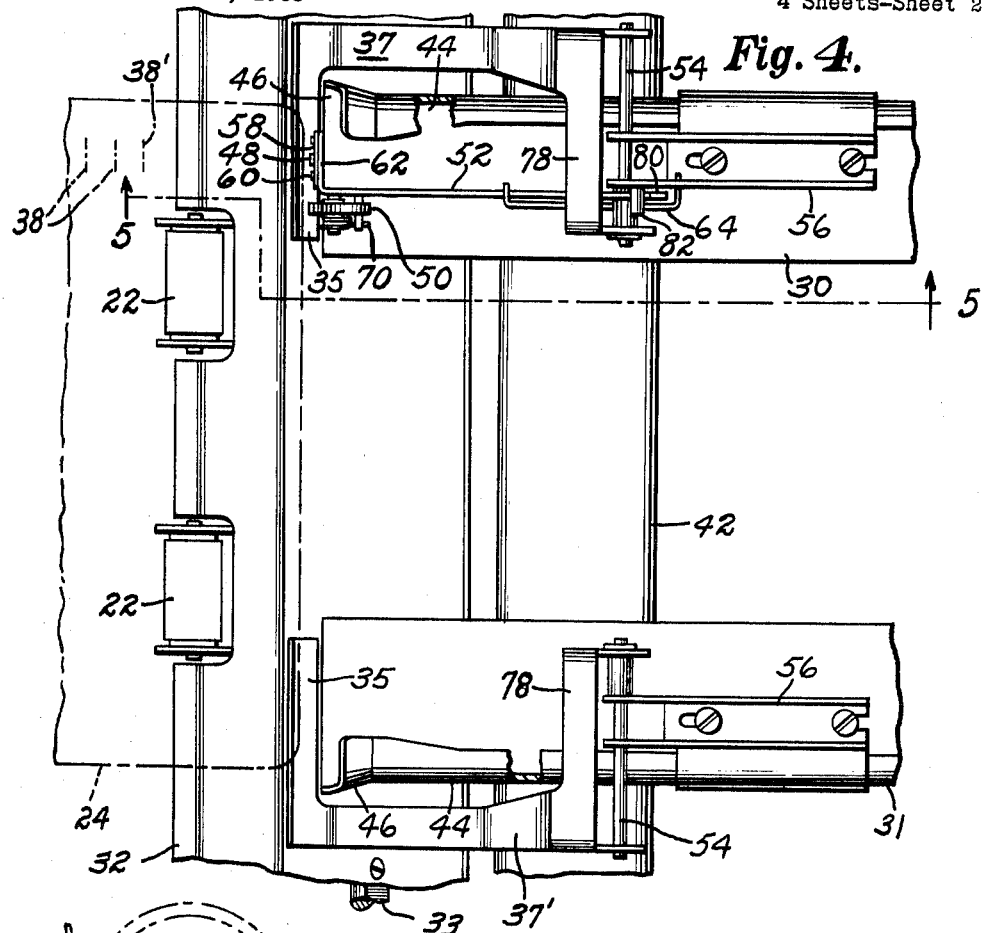
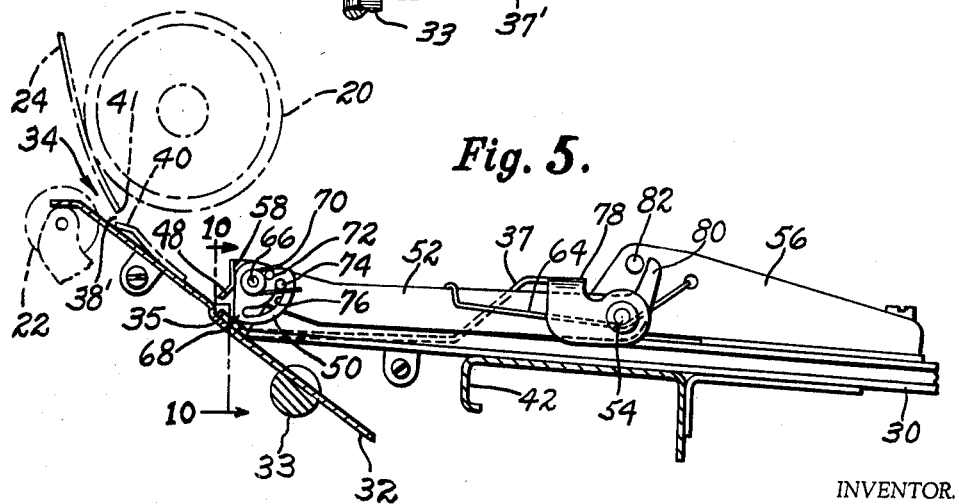

April 26, 1966 F. E. HOLLADAY 3,247,945
AUTOMATIC LINE FIND DEVICE
Filed Oct. 14, 1963 4 Sheets-Sheet 3
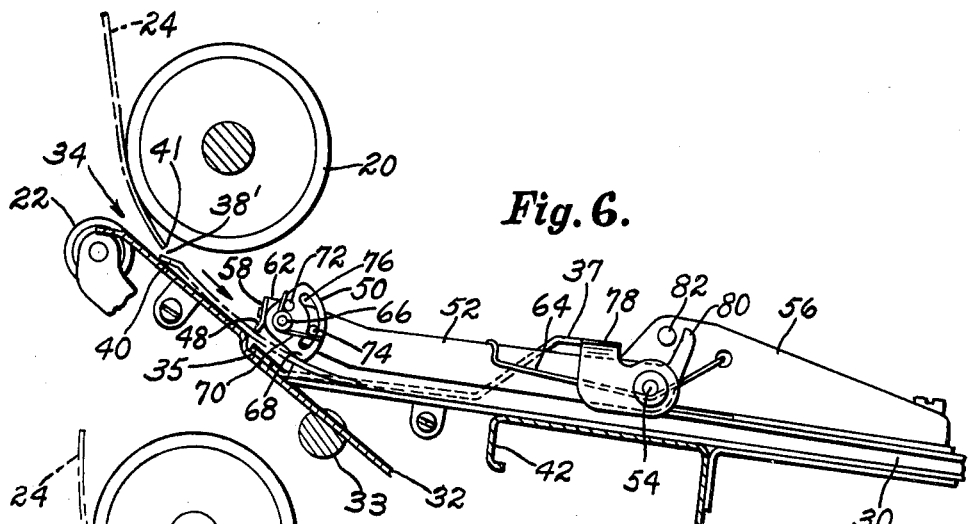
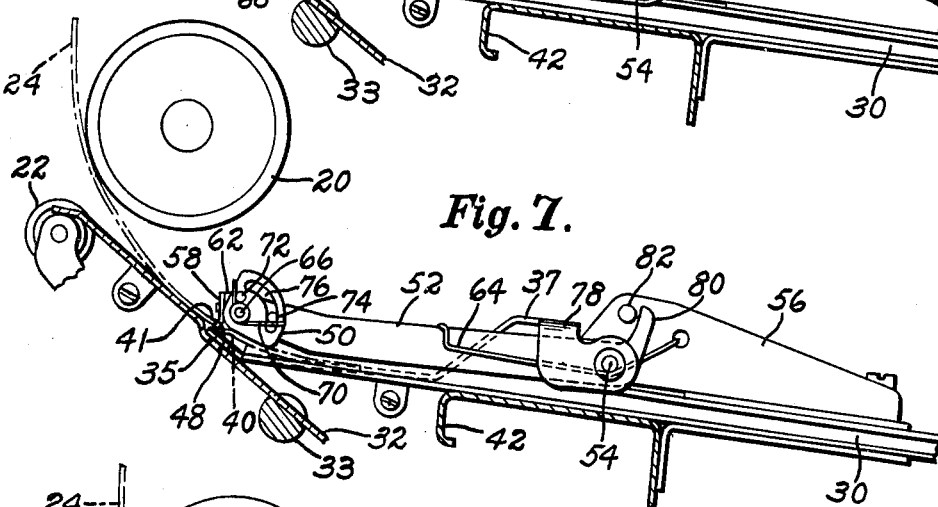
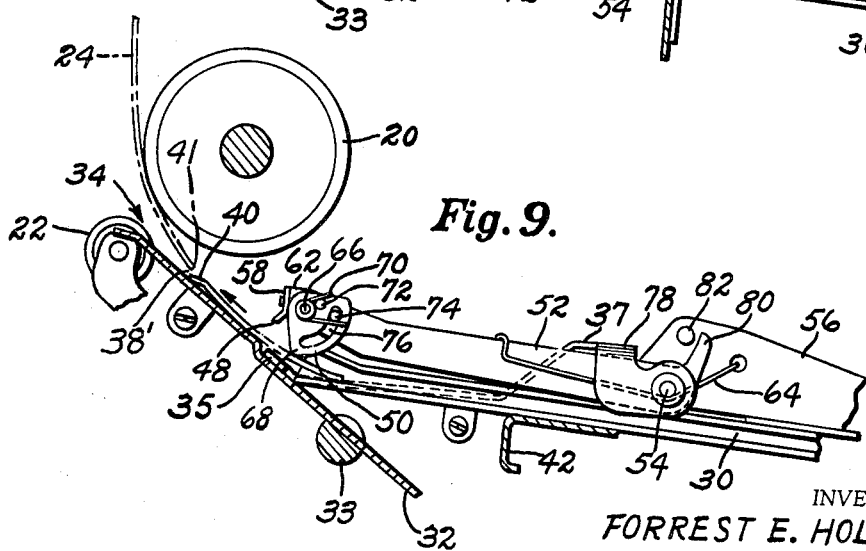
INVENTOR.
FORREST E. HOLLADAY.
BY
ATTORNEY.

April 26, 1966  F. E. HOLLADAY  3,247,945
AUTOMATIC LINE FIND DEVICE
Filed Oct. 14, 1963  4 Sheets—Sheet 4
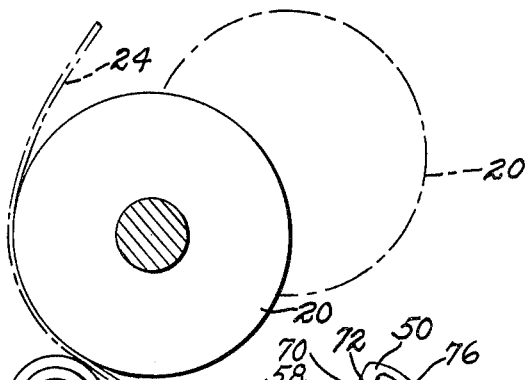
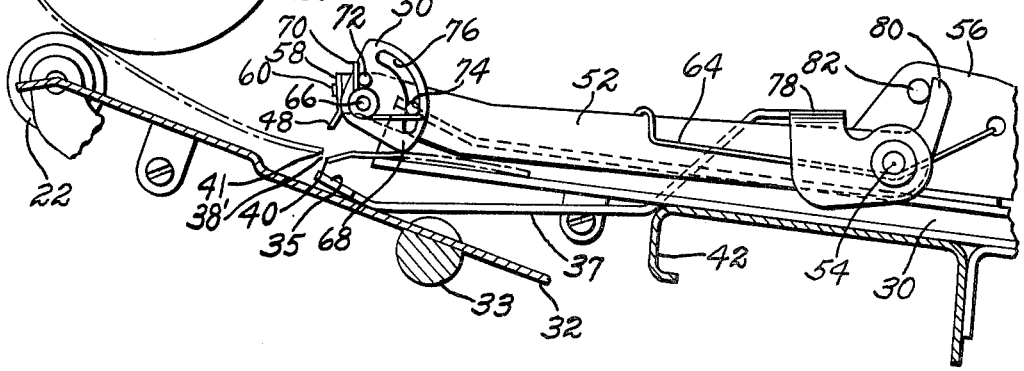
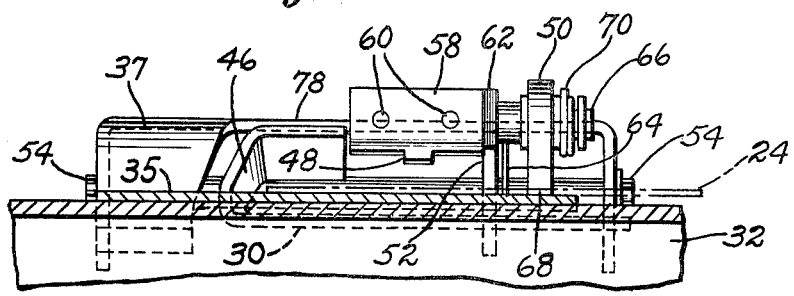
INVENTOR.
FORREST E. HOLLADAY.
BY
ATTORNEY.

United States Patent Office 3,247,945
Patented Apr. 26, 1966

3,247,945
AUTOMATIC LINE FIND DEVICE
Forrest E. Holladay, Plymouth, Mich., assignor to Burroughs Corporation, Detroit, Mich., a corporation of Michigan
Filed Oct. 14, 1963, Ser. No. 315,763
6 Claims. (Cl. 197—127)

This invention relates generally to printing apparatus and particularly to record sheet line finding devices for accounting machines.

It is an object of the present invention to provide an improved sheet operated line find device for stopping the feeding of a sheet at a position corresponding to the location in the sheet of a line designating perforation.

Another object of the invention is to provide an inexpensive yet reliable automatically operable line find device by the provision of a prop or displaceable support member which, in response to an approaching sheet, releases a sheet stop member for engagement of the latter in a line designating aperture in the sheet.

Another object of the invention is to provide an improved line find device of a character such that travel of a record sheet in a sheet ejection direction effects a resetting of the prop and therefore the sheet stop member to remove obstruction by the stop member to sheet ejection.

Another object of the invention is to provide a prop controlled sheet stop member in which the prop is retracted by the leading edge of an approaching sheet.

Another object of the invention is to provide in a line find device of the above mentioned character for separation between the line find stop or perforation sensing member and record sheet in the perforation area to allow for movement of the sheet by platen or feed roll rotation without obstruction and resultant damage to the perforation edges.

Other objects of the invention will become apparent from the following detail description, taken in connection with the accompanying drawings in which:

FIG. 4 is a fragmentary plan view, taken in the direction of the arrows 4—4 of FIG. 2;

FIG. 5 is a vertical sectional view, taken along the line 5—5 of FIG. 4;

FIGS. 6 and 7 are views similar to FIG. 5 illustrating the positions the line find operating parts will assume as a record sheet proceeds to the line find position;

FIG. 8 is a view similar to FIGS. 6 and 7 illustrating separation of the sheet and line sensing element prior to the printing operation.

FIG. 9 is a view similar to FIGS. 6, 7 and 8 illustrating the positions the line find operating parts assume as a processed sheet is ejected from the machine; and FIG. 10 is a cross sectional view, taken along the line 10—10 of FIG. 5.

Figure 1:
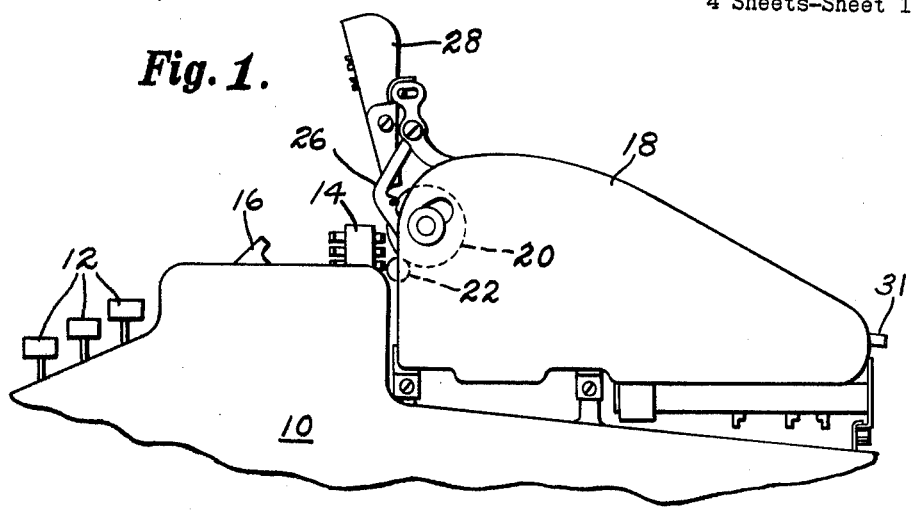
FIG. 1 is a fragmentary side view of an accounting machine embodying features of the invention.

Referring to the drawings by characters of reference and first to FIG. 1 the accounting machine shown is of a well known type having a mechanism housing 10, a keyboard 12, a print head 14 and print hammers 16 of the latter of which only one is shown. Mounted on the enclosed main frame of the machine, rearwardly of the print head 14, there is a carriage 18 which carries a roll-type platen 20 adjacent the print head 14. Preferably a line of pressure rollers 22, of which only one is shown, is provided for cooperation with the platen 20 to hold and feed a record or ledger sheet 24. A pair of pivotal arms 26 are mounted respectively on and to the sides of the machine and carried by each of the arms there is a sheet side guide member 28.

Figure 2:
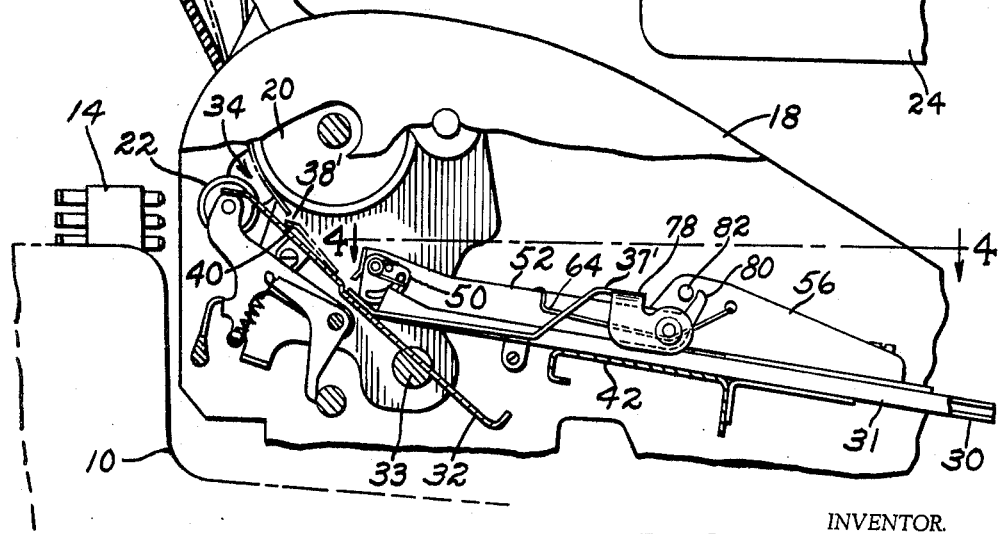
FIG. 2 is an enlarged fragmentary side view, partly broken away and in section, of the machine of FIG. 1.

The accounting machine is of the type in which the platen 20 and the sheet side guide members 28 are retractable to the positions shown in FIG. 2 for ease of insertion of a record sheet and such retraction, commonly referred to as the opening of the carriage, can be done by key operation or automatically, as desired. However, the mechanism for opening and closing the carriage has not been shown in detail as such mechanism is well known in the art and forms no part of the present invention. For a detail showing and description of the carriage opening and closing mechanism, reference may be had to the patent to Thomas M. Butler, No. 2,629,549, issued February 24, 1953, for "Automatic Function Control Mechanism for Accounting Machines."

The sheet guideway comprises, in general, the above mentioned upper side guide members 28, laterally positioned lower guide members or rails 30, 31 and an intermediate guide member or plate 32. The guide member 32 is arranged below the platen 20 in an inclined plane, the guide plate having an upper end which extends forwardly of the platen periphery to form a sheet receiving throat 34 therewith. From its upper end, the guide plate 32 extends downwardly and rearwardly below the forward ends of the lower guide rails 30 and 31 and from the lower end of the intermediate guide member 32, the lower guide rails 30, 31 extend rearwardly and downwardly, the angle of inclination of rails 30 and 31 being less than the angle of inclination of member 32 such that the upper surfaces of the pair of rails and member 32 form an obtuse angle therebetween, as seen, for example, in FIG. 5. The intermediate guide member 32 is affixed to a flattened portion of a transverse rotatable shaft 33, the shaft being part of the mechanism for effecting the aforementioned opening and closing operation of the platen 20. Normally, the guide member 32 supports the free ends 35 of a pair of sheet supporting members or levers 37, 37' for a purpose hereinafter described.

Figure 3:
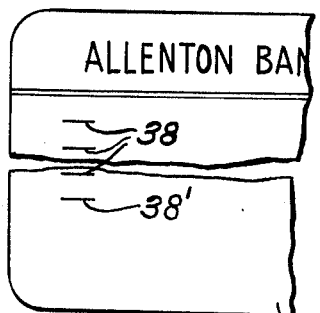
FIG. 3 is a front view of a fragment of a record or ledger sheet for processing by the machine.

A fragment of the record sheet 24, of a type suitable for use in connection with the present invention, is illustrated in FIG. 3, the sheet preferably being a heavy and somewhat resilient paper or card stock. Adjacent the leftward side edge of the sheet 24 there is a vertical column of horizontal slit-like perforations 38 which designate lines that have been printed on the sheet. The lowermost slit or slit 38' designates the last perforation made in the sheet and therefore the next unused line of the sheet. These slits are preferably made with a punch of a character which will displace the sheet area immediately below a slit such that a small portion 40 in said area projects forwardly and downwardly from the plane of the card, as illustrated for example in FIG. 5. This provides a downwardly facing edge 41 of the slit exposed for abutment purposes in connection with the line find device hereinafter described.

As shown in FIG. 4, the guide rails 30, 31 are mounted on a cross member 42 which may be suitably secured to the machine frame, the guide rails being in relative parallel relation and each having an inwardly facing sheet guiding channel 44 along the outer edge thereof. At their forward ends, the guide rails 30, 31 are preferably flared outwardly, as at 46, to pilot the leading edge of a sheet into the guide channels 44.

In accordance with the invention, I provide a sheet stop member 48 to stop the feeding of a record sheet into the carriage of the machine at a position to present the next available line, designated 38', at the print line, and a sheet retractable prop 50 normally holding the stop member in an ineffective or raised position. The stop member 48 and its prop 50 are both mounted on the free end of a lever arm 52, in overlying relation to the guide rail 30, adjacent the forward end thereof or in the region of the apex of the obtuse angle formed by the guide rails 30, 31 and the guide member 32. The lever arm 52 extends longitudinally of the guide rail 30 and is pivoted on a pivot pin 54 to a bracket 56 which may be mounted on and secured to the guide rail 30. The stop member 48 is formed out of the lower edge of a thin metal plate 58 which may be secured, such as by rivets 60, flat against a laterally extending flange 62 formed on the free end of the lever 52. As shown, the stop member 48 is positioned in a plane that extends transversely to and above the path of sheet travel and is, of course, located for movement into the path of the column of the line designating perforations. A wire spring 64 is provided to urge the lever arm 52 in a counterclockwise direction, FIG. 5, and thus the stop member 48 down against the upper face of a record sheet enroute along the guideway.

The prop 50 is rotatably mounted on the free end of the lever arm 52 by means of a pivot pin 66 which has one end secured to the arm and extends laterally therefrom. Preferably, the prop 50 is made of a suitably hard, light weight plastic material and has a rounded lower portion 68 that normally seats on the inclined end portion or land 35 of the lever 37, adjacent the forward end of the guide rail 30, the land 35 in part forming the sheet guideway. A torsion spring 70 is provided to return the prop 50 to normal position. The torsion spring 70 has a convolution about the pivot pin 66 with one leg of the spring abutting a pin 72 carried by the prop 50 and the other leg of the spring abutting a pin 74 that is affixed to the lever arm 52. The pin 74 is received in an arcuate slot 76 in the prop 50 and rotation of the prop in one direction or to its normal position, FIG. 5, is limited by engagement of pin 74 against the upper end of the slot. It will be seen that the land 35 provides an inclined surface for the lower end of the prop 50 and that when the prop is retracted by the leading edge of a sheet, the prop immediately drops off of the land 35 which results in the quick descent of the sheet stop member 48, aided by the spring 64.

As shown, the pair of levers 37, 37' are alike and are pivoted respectively to the shafts 54 adjacent opposite side guide members 30 and 31. As viewed in FIG. 4, the levers 37 are generally C-shape having a lateral leg 78 parallel to the pivot pin 54 and a second lateral leg or end portion which is in the same plane or substantially contiguous with the rear end of guide rail 30 and provides the land 35.

Adjacent the pivot shaft 54, the prop carrying lever 52 has an upwardly directed arm 80 to engage a stop member or stud 82, secured in and to the adjacent side of the channel bracket 56 so as to limit counterclockwise pivoting of lever 52. Normally, the arm 80 is in spaced relation to the stud 82, as shown in FIG. 5.

Operation

Normally the operating parts of the apparatus will be in the positions shown in FIGS. 2 and 5 with the prop 50 resting on the normally raised land 35, holding the sheet stop member 48 in its raised ineffective position. Also in FIGS. 2 and 5, a record sheet 24 is shown as being fed manually along platen 20 and the pressure rollers 22 with the leading edge of the sheet approaching the prop 50. As feeding of the sheet continues, the leading edge thereof engages the lower end of the prop 50 and pivots the prop counterclockwise to the retracted position shown in FIG. 6. Retraction of the prop by the sheet quickly releases the lever arm 52 and allows the stop member 48 to descend and engage the upper surface of the sheet 24, contact between the lower edge of the stop member 48 and the upper surface of the sheet 24 being aided by the spring 64. In addition, the maintenance of such contact is effected by the provision of the obtuse angle between guide rails 32 and the guide rails 30, 31 as the record sheet, as previously mentioned, is resilient and is forced to bow, by spring 64, between the surfaces of the relatively inclined rails 30, 31 and guide member 32, thus tensioning the sheet against the lower edge of the stop member 48. This tensioning of the sheet also holds the prop retracted against the opposing force of its return spring 70. As the sheet proceeds, the stop member 48, under the urging of its spring 64, engages in the slit 38' and the sheet is stopped by the edge 41 of the slit against the stop member, as shown in FIG. 7. In this position, the stop member 48 has descended to rest on the deformed sheet portion 40. With the sheet 24 now in the desired position as determined by the next available line designating slit 38', FIG. 7, the platen 20 and its pressure rollers 22 are brought together, FIG. 8, and this action tends to move the sheet rearwardly. As previously mentioned, the moving together, or closing action between the platen 20 and its pressure rollers 22 is effected by mechanism including the rotatable shaft 33 and when this operation occurs, the guide member 32 is pivoted counterclockwise to the position shown in FIG. 8. Since the levers 37, 37' are supported at their free ends or lands solely by the guide member 32, the levers pivot therewith by gravity to the positions shown in FIG. 8. This allows the record sheet, as it is urged rearwardly by the closing of the platen to bow further in a downward direction separating it from the line find stop member 48, thus preventing thrust of the perforation edge 41 and resultant damage thereto by the closing action of the platen 20. The free end of lever 52, carrying the sheet stop member 48, follows the pivotal action of lever 37 for a slight movement and is stopped by the engagement of arm 80 against the stud 82, the arm 37 continuing downward to the limit of guide members 37, 37'. After the printing operation, the platen 20 and pressure rollers 22 are moved apart and the record sheet is manually withdrawn from the machine. As the sheet is withdrawn, FIG. 9, the sheet rotates the prop 50 clockwise to its normal position which raises the stop member 48, the prop again resting on the inclined lever cam portion 35 to hold the stop member 48 in raised position until the leading edge of the next inserted sheet retracts the prop.

What is claimed is:

1. In a sheet processing apparatus having a print line, a line find device for stopping a sheet in a position corresponding to the location of a line designating perforation in the sheet comprising, means forming a sheet guideway, a pivoted arm, a sheet stop member carried by said arm and overlying said guideway above the path of travel of the perforation, said arm being biased in a direction to move said stop member down to an effective perforation engaging position, and a retractable prop normally holding said arm in a raised position and said stop member in an ineffective position, said prop being pivotally mounted on said arm outwardly from the pivot point thereof for rotation relative to said arm and to said stop member and positioned in the path of the leading edge of a sheet for retraction thereby.

2. In a sheet processing apparatus having a print line, a line find device for stopping a sheet in a position corresponding to the location of a line designating perforation in the sheet comprising a sheet guideway structure, an arm pivotally mounted on said guideway structure and extending longitudinally of the guideway, a sheet stop member carried by said arm on the longitudinal extension thereof, said arm having a raised position holding said stop member in a rised ineffective position and having a lowered position holding said stop member in an effective position in the path of a perforation in a sheet and biased toward the latter position, a prop pivotally connected to said arm adjacent said stop member, normally supporting said arm in the raised position thereof against said biasing action and pivotally retractable relative to said stop member by the leading edge of a sheet.

3. In a record processing appartus having a print line, a line find device for stopping a resilient record sheet in a position at the print line corresponding to the location of a line designating perforation in the sheet comprising, a first sheet guide member, a second sheet guide member, the guide surfaces of said guide members forming an obtuse angle therebetween to effect the bowing of a sheet traversing said surfaces, a movable sheet stop member overlying the path of sheet travel in the region of the apex of the obtuse angle, said stop member biased toward the sheet, a movable land between said guide members forming therewith a sheet guideway, a prop normally resting on said land and holding said stop member in an ineffective position, said prop retracted by the leading edge of a sheet to release said stop member to engage in a line designating slit in and stop the sheet, at least one of said guide members and said land movable in a direction to effect further bowing of the sheet and its retraction from said stop member, and means operable to effect movement of said one member and land.

4. In a record processing apparatus having a print line, a line find device for stopping a resilient record sheet in a position at the print line corresponding to the location of a line designating perforation in the sheet comprising a first sheet guide member, a second sheet guide member, the guide surfaces of said guide members forming an obtuse angle therebetween to effect the bowing of a sheet transversely to the direction of sheet travel, a sheet stop member facing said surfaces in the region of the apex of said obtuse angle and the path of a sheet perforation, said stop member mounted for movement from an ineffective position to an effective position to engage in a line designating sheet perforation to stop the sheet, a spring uring said stop member to the effective position thereof, and a retractable prop normally holding said stop member in the ineffective position and retractable by the leading edge of a sheet.

5. In a record processing apparatus having a print line, a line find device for stopping a resilient record sheet in a position at the print line corresponding to the location of a line designating perforation in the sheet comprising a first sheet guide member, a second sheet guide member, said guide members having upwardly facing sheet traversing surfaces forming an obtuse angle to effect bending of a sheet transversely of the direction of sheet travel, an arm pivotally mounted on said supporting means and having a free end above said guide members in the region of the obtuse angle, a sheet stop member carried by the free end of said arm and overlying the path of travel of a sheet perforation, said stop member having an upper ineffective position and having a lower sheet engaging position, a spring acting on said arm to urge said stop member against a sheet to bow the latter, a land carried by said arm in the region of the apex of the obtuse angle, and a prop pivotally connected to the free end of said arm laterally of said stop member and normally resting on said land, said prop pivotally retractable by the edge of a sheet to release said stop member.

6. In a record processing apparatus having a print line, a line find device for stopping a resilient record sheet in a position at the print line corresponding to the location of a line designating perforation in the sheet comprising a first and pivotally mounted sheet guide member, a second sheet guide member, the sheet guiding surfaces of said guide members forming an obtuse angle therebetween to effect the bowing of a sheet traversing said surfaces, a movable sheet stop member overlying the path of travel of a line designating perforation in a sheet and in the region of the apex of said obtuse angle, said stop member biased toward the sheet guiding surfaces of said guide members, a prop normally supported by one of said guide members and propping said stop member in an ineffective position, said prop member retracted by a leading edge of a sheet to release said stop member against the sheet to engage in a line designating sheet perforation, said first guide member pivotal away from said second guide member in a direction to increase said obtuse angle to effect detachment of a sheet from said stop member, and a platen movable from a sheet receiving position to a sheet holding position to pivot said first guide member away from said second guide member.

References Cited by the Examiner

UNITED STATES PATENTS

| 2,832,454 | 4/1958 | Martin | 197—127 |
| 3,100,037 | 7/1963 | Green et al. | 197—127 |

FOREIGN PATENTS 935,908  12/1955  Germany.

ROBERT E. PULFREY, *Primary Examiner.*